(12) United States Patent
Gruner

(10) Patent No.: US 10,850,829 B2
(45) Date of Patent: Dec. 1, 2020

(54) AERODYNAMIC FLAP SUPPORT STRUCTURE

(71) Applicant: The Boeing Company, Chicago, IL (US)

(72) Inventor: Bryan Jacob Gruner, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 309 days.

(21) Appl. No.: 16/018,517

(22) Filed: Jun. 26, 2018

(65) Prior Publication Data

US 2019/0389560 A1   Dec. 26, 2019

(51) Int. Cl.
| | |
|---|---|
| *B64C 9/02* | (2006.01) |
| *B64C 9/16* | (2006.01) |
| *B64C 3/28* | (2006.01) |
| *B64C 3/26* | (2006.01) |

(52) U.S. Cl.
CPC .............. *B64C 9/02* (2013.01); *B64C 3/26* (2013.01); *B64C 3/28* (2013.01); *B64C 9/16* (2013.01)

(58) Field of Classification Search
CPC .... B64C 9/02; B64C 9/16; B64C 3/26; B64C 3/28
See application file for complete search history.

(56) References Cited

U.S. PATENT DOCUMENTS

| | | | | |
|---|---|---|---|---|
| 2007/0102589 | A1* | 5/2007 | Holert | B64C 9/16 244/215 |
| 2015/0292561 | A1* | 10/2015 | McNeil | F16C 23/086 244/213 |
| 2016/0068255 | A1* | 3/2016 | Soenarjo | B64C 3/50 244/215 |
| 2017/0158310 | A1* | 6/2017 | Osborn | B64C 9/02 |
| 2019/0112027 | A1* | 4/2019 | Ahern | B64C 9/02 |
| 2019/0161165 | A1* | 5/2019 | Milligan | B64C 9/16 |

OTHER PUBLICATIONS

New R&D Programme for Flap Supports; SL Sabaca Limburg N.V. (2018).

\* cited by examiner

*Primary Examiner* — Rodney A Bonnette
(74) *Attorney, Agent, or Firm* — Parsons Behle & Latimer

(57) ABSTRACT

A flap deployment apparatus and system for a wing of an aircraft that includes a support structure having a first aerodynamic surface. A nose fitting secures the support structure to a forward portion of an aircraft wing and an aft fitting secures the support structure to an aft portion of the wing. A carrier beam having a second aerodynamic surface is coupled to the support structure. The carrier beam is movable between a stowed position and a deployed position. Links guide the carrier between the positions. The first and second aerodynamic surfaces are configured to define a continuous aerodynamic surface when the carrier beam is in the stowed position. The apparatus includes a nose fairing having a third aerodynamic and a mid fairing cover having a fourth aerodynamic surface. The third and fourth aerodynamic surfaces also defines the continuous aerodynamic surface when the carrier beam is in the stowed position.

20 Claims, 6 Drawing Sheets

AERODYNAMIC FLAP SUPPORT STRUCTURE

BACKGROUND

Field of the Disclosure

The examples described herein relate to a flap deployment apparatus, flap deployment systems, and methods of providing flap deployment systems for aircraft that include a support structure having a first aerodynamic surface. The first aerodynamic surface combines with an aerodynamic surface of a carrier beam to define a continuous aerodynamic surface when the carrier beam is in a stowed position.

Description of the Related Art

The wings of aircraft typically include flaps, which are usually secondary control surfaces on the trailing edge of the wing. Flap deployment systems may be used to deploy the flaps aft and down from the trailing edge of the wing. Flaps may be lowered to increase the camber of the wing and provide greater lift and/or control at slower flying speeds. Typically, flaps may be extended up to approximately 55 degrees. Flaps are typically connected to the wing by a support beam. Flaps are generally moveable from a stowed position to a deployed positioned by various actuators moving a carrier beam that is hinged to the support beam. An aerodynamic fairing is typically used to cover these structural components, i.e. the support beam and carrier beam, to decrease the drag. A fairing is typically a non-structural (i.e., non-load bearing) component that has an outer aerodynamic surface.

While the fairing covering of typical flap support structures decreases the drag that would be encountered by the structural components contained within the fairing, the fairing increases the overall weight of the aircraft. Additionally, the use of fairings increases the complexity, manufacturing, and labor required to manufacture and maintain an aircraft. FIG. 7 is a schematic of an example flap deployment system 200 on a commercial aircraft. The deployment system 200 is connect to the wing of the aircraft by a support beam 210 and the flaps are connected to a carrier beam 220, which is hingedly connected to the support beam 210. An actuator moves the carrier beam 220 to deploy the flaps, as necessary. A fairing 230 covers the structural components, i.e. the support beam 210 and carrier beam 220, to decrease the drag that that the structural components would cause without the fairing 230. However, the fairing 230 adds to the weight of the aircraft, which increases fuel consumption. Fairings 230 on commercial aircraft are typically large and add to the overall drag of the aircraft. It would be beneficial to decrease the weight of the aircraft while also reducing the drag caused by the flap deployment system 200 including the fairing 230.

SUMMARY

The present disclosure is directed to a flap deployment system for a wing of an aircraft that includes a continuous aerodynamic surface while in the stowed position without the use of a fairing to cover the entire flap deployment system.

One example of the present disclosure is a flap deployment system for a wing of an aircraft comprising a support structure having a first aerodynamic surface. The flap deployment system includes a nose fitting coupled to a first end of the support structure. The nose fitting is configured to secure the support structure to a forward portion of a wing. The flap deployment system includes an aft fitting coupled to the support structure. The aft fitting is configured to secure the support structure to an aft portion of the wing. A carrier beam is coupled to a second end of the support structure. The carrier beam is movable between a stowed position and a deployed position. The carrier beam has a second aerodynamic surface. The carrier beam is configured to be coupled to a flap of the wing. The flap deployment system include a plurality of links for guiding the carrier beam between the stowed position and the deployed position.

The flap deployment system may comprise a tail fitting that is coupled to the second end of the support structure. The tail fitting may couple the carrier beam to the second end of the support structure. The plurality of links of the flap deployment system may be coupled between the tail fitting and the carrier beam. The flap deployment system may include a nose fairing disposed over the nose fitting. The nose fitting has a third aerodynamic surface.

The flap deployment system may include a mid fairing that has a fourth aerodynamic surface. The mid fairing may be positioned between the aft fitting and the carrier beam and may be also positioned between the support structure and the wing. The first, second, third, and fourth aerodynamic surfaces may be configured to define a continuous aerodynamic surface when the carrier beam is located in the stowed position. The support structure may be comprised of a composite material. The nose fitting and the aft fitting may both be comprised of metallic fittings.

One example of the present disclosure is a flap deployment apparatus that comprises a support structure having a first end and a second end. The support structure has a first aerodynamic surface. The flap deployment apparatus includes a nose fitting coupled to the first end of the support structure and an aft fitting also coupled to the support structure. The aft fitting is positioned between the first end of the support structure and the second end of the support structure. The flap deployment apparatus includes a tail fitting coupled to the second end of the support structure and a carrier beam having a second aerodynamic surface. The carrier beam is coupled to the second end of the support structure via the tail fitting. The carrier beam is movable between a first, or stowed, position and a second, or deployed, position. The flap deployment apparatus includes a nose fairing disposed over the nose fitting. The nose fairing has a third aerodynamic surface. The flap deployment apparatus includes at least one link for guiding the carrier beam between the first position and the second position.

The first, second, and third aerodynamic surfaces may be configured to define a continuous aerodynamic surface when the carrier beam is in the first position. The support structure may be a semi-monocoque structure. The at least one link may be coupled between the tail fitting and the carrier beam. The flap deployment apparatus may include at least two links coupled between the tail fitting and the carrier beam. The flap deployment apparatus may include a mid fairing that has a fourth aerodynamic surface. The mid fairing may be positioned between the aft fitting and the carrier beam. The first, second, third, and fourth aerodynamic surfaces may be configured to define a continuous aerodynamic surface when the carrier beam is in the first position.

One example of the present disclosure is a method of providing a flap deployment apparatus comprising coupling a nose fitting to a first end of a support structure and coupling an aft fitting to the support structure. The support structure has a first aerodynamic surface. The method comprises coupling a carrier beam to a second end of the support structure with the carrier beam having a second aerodynamic surface. The carrier beam being movable between a stowed position and a deployed position. When the carrier beam is in the stowed position, the first and second aerodynamic surfaces are configured to define a continuous aerodynamic surface.

The method may comprise coupling a nose fairing to the nose fitting with the nose fairing having a third aerodynamic surface. The first, second, and third aerodynamic surfaces may be configured to define the continuous aerodynamic surface when the carrier beam is in the stowed position. The method may comprise coupling a mid fairing having a fourth aerodynamic surface to the support structure. The mid fairing may be positioned along the support structure between the aft fitting and the carrier beam. The first, second, third, and fourth aerodynamic surfaces may be configured to define the continuous aerodynamic surface when the carrier beam is in the stowed position. The method may comprise coupling a tail fitting to the second end of the support structure. The carrier beam may be coupled to the second end of the support structure via the tail fitting. The method may include coupling at least one link between the tail fitting and the carrier beam.

Figure 1:
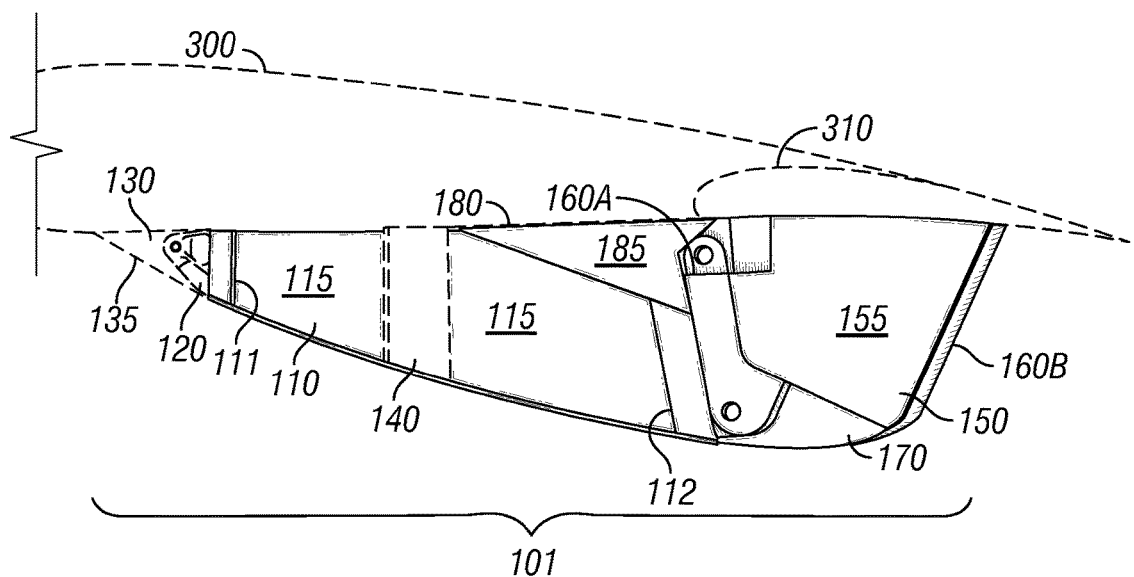
FIG. 1 shows a schematic of one example of a flap deployment apparatus having a continuous aerodynamic surface.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows a schematic of one example of a flap deployment apparatus 100A having a continuous aerodynamic surface. As used herein an aerodynamic surface is a surface having a shape that reduces a drag from the relative motion of air along the surface. The flap deployment apparatus 100A includes a support structure 110 that is connected to a wing 300 of an aircraft and a carrier beam 150 connected to a flap 310 of the aircraft. The support structure 110 is a structural component that also includes a first aerodynamic surface 115. A nose fitting 120 is connected to a first end 111 of the support structure 110 and a tailing fitting 170 is connected to the second end 112 of the support structure 110. The tail fitting 170 connects the carrier beam 150 to the second end 112 of the support structure 110. A plurality of links 160A, 160B guide the carrier beam 150 as it moves between a stowed position and a deployed positioned as discussed herein. The tail fitting 170 may be integral to the support structure 110 or the carrier beam 150 and links 160A, 160B may directly connected to the second end 112 of the support structure 110 depending on the application. The support structure 110 also includes an aft fitting 140 that is positioned between the first end 111 and the second end 112 of the support structure 110.

Figure 4:
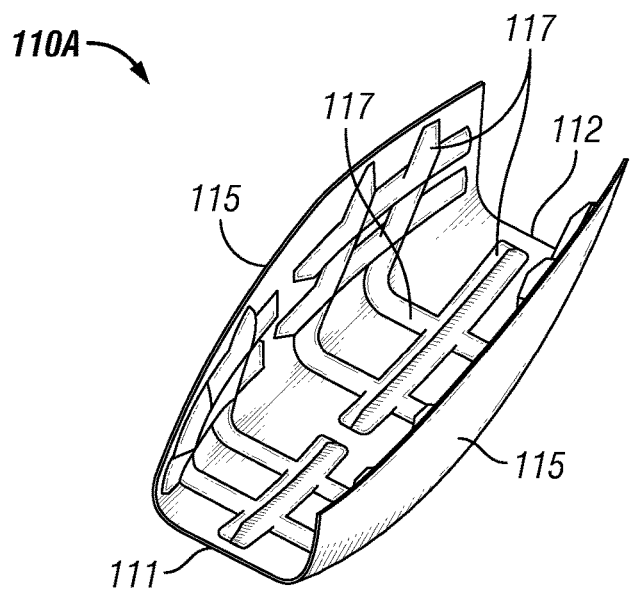
FIG. 4 shows a schematic of one example of a support structure.
Figure 5:
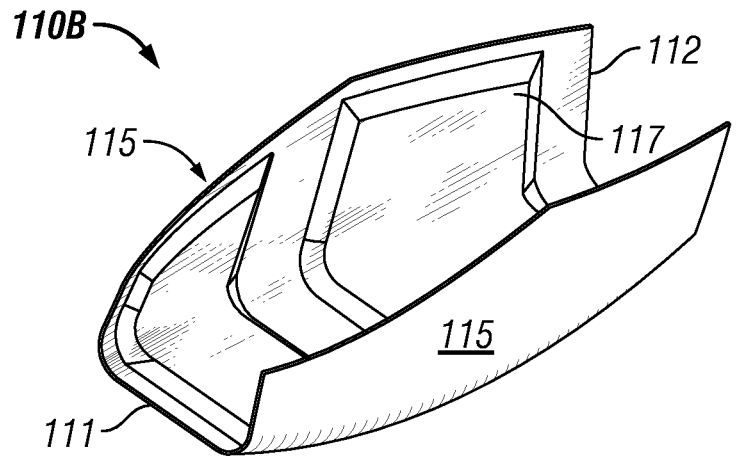
FIG. 5 shows a schematic of one example of a support structure.

The support structure 110 may manufactured by various methods. The support structure 110 may comprise a composite member with the nose fitting 120 and/or the aft fitting 140 integrated with the support structure 110 during the formation process. FIG. 1 shows that aft fitting an internal component integrated within the support structure 110. The support structure 110 may be a hollow composite member having an external first aerodynamic surface 115 with internal reinforcing members. For example, FIG. 4 shows an example of a support structure 110A having a first end 111, a second end 112, a first external aerodynamic surface 115, and a plurality of internal stiffener members 117. FIG. 5 shows another example of a support structure 110B having a first end 111, a second end 112, a first external aerodynamic surface 115, and a plurality of internal stiffener members 117 in the form of a honeycomb structure. The size, shape, configuration, and/or number of the support structure 110 and/or internal stiffener members 117 are shown for illustrative purposes and may be varied depending on the application. As shown in the various figures, the support structure 110 may be formed as a semi-monocoque structure. As used herein, semi-monocoque is an aircraft, or other vehicle, structure that combines a load-bearing shell with an integral frame. The support structure 110 can be a structural element while having an aerodynamic surface on the exterior of the semi-monocoque shell.

The nose fitting 120 may be a metallic fitting that is configured to secure the first end 111 of the support structure 110 to a forward portion of a wing 300 of an aircraft. The nose fitting 120 may be connected to the first end of the support structure 110 or may be formed integral to the support structure 110 during the process of forming the support structure 110. The aft fitting 140 may be a metallic fitting that is configured to secure the support structure 110 to an aft portion of the wing 300 of the aircraft. The aft fitting 140 may be connected to the support structure 110 or may be formed integral to the support structure 110 during the process of forming the support structure 110. The size, shape, and/or configuration of the nose fitting 120 and/or aft fitting 140 are shown for illustrative purposes and may be varied depending on the application.

The carrier beam 150 of the flap deployment apparatus 100A includes a second aerodynamic surface 155 that in combination with the first aerodynamic surface 115 of the support structure 110 defines a continuous aerodynamic surface 101 (best shown in FIG. 9) while the carrier beam 150 is in the stowed position (shown in FIG. 1) to reduce the drag caused by the flap deployment apparatus 100A. An actuator (not shown) in combination with links 160A, 160B may be used to move the carrier beam 150 and attached flap 310 from a first, or stowed, position (shown in FIG. 1) to a second, or deployed, position (shown in FIG. 6D) or to various positioned between the stowed and deployed positions. The size, shape, and/or configuration of the carrier beam 150 is shown for illustrative purposes and may be varied depending on the application.

A nose fairing 130 is positioned over the nose fitting 120. The nose fairing 130 has a third aerodynamic surface 135 that in combination with the first aerodynamic surface 115 of the support structure 110 and the second aerodynamic surface 155 of the carrier beam 150 define a continuous aerodynamic surface 101 when the carrier beam 150 is in the stowed position. The size, shape, and/or configuration of the nose fairing 130 is shown for illustrative purposes and may be varied depending on the application. FIG. 1 shows the nose fairing 130 in dash for clarity purposes concerning the components of the flap deployment apparatus 100A over which the nose fairing 130 is positioned.

A mid fairing 180 is positioned between the aft fitting 140 and the carrier beam 150. The mid fairing 180 has a fourth aerodynamic surface 185 that in combination with the first aerodynamic surface 115 of the support structure 110, the second aerodynamic surface 155 of the carrier beam 150, and the third aerodynamic surface 135 of the nose fairing 130 define a continuous aerodynamic surface 101 when the carrier beam 150 is in the stowed position. The size, shape, and/or configuration of the mid fairing 180 is shown for illustrative purposes and may be varied depending on the application.

The flap deployment apparatus 100A includes structural components, the support structure 110 and the carrier beam 150, that have aerodynamic surfaces 115, 155, which eliminates the need to cover the flap deployment apparatus 100A with a fairing. Instead, two small fairings, the nose fairing 130 and the mid fairing 180, having aerodynamic surfaces may be used to define a continuous aerodynamic surface 101 on the exterior of the flap deployment apparatus 100A when the carrier beam 150 is in the stowed position. The elimination of an outer overall fairing may decrease the overall weight and/or drag of the aircraft.

Figure 2:
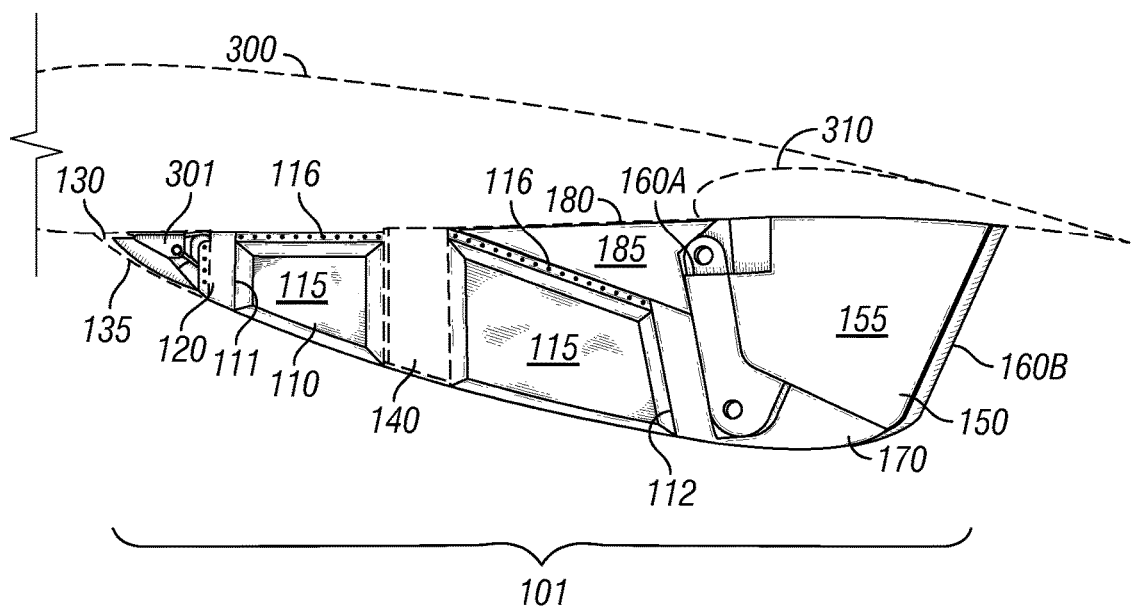
FIG. 2 shows a schematic of one example of a flap deployment apparatus having a continuous aerodynamic surface.

FIG. 2 shows a schematic of one example of a flap deployment apparatus 100B having a continuous aerodynamic surface. The flap deployment apparatus 100B includes a support structure 110 that is connected to a wing 300 of an aircraft and a carrier beam 150 connected to a flap 310 of the aircraft. The support structure 110 is a structural component that also includes a first aerodynamic surface 115. A nose fitting 120 is connected to a first end 111 of the support structure 110. The nose fitting 120 is configured to connect to plate 301 that connects the support structure 110 to the wing 300.

A tailing fitting 170 is connected to the second end 112 of the support structure. The tail fitting 170 connects the carrier beam 150 to the second end 112 of the support structure 110. A plurality of links 160A, 160B guide the carrier beam 150 as it moves between a stowed position and a deployed positioned as discussed herein. The tail fitting 170 may be integral to the support structure 110 or the carrier beam 150 and links 160A, 160B may directly connected to the second end 112 of the support structure 110 depending on the application. The support structure 110 also includes an aft fitting 140 that is positioned between the first end 111 and the second end 112 of the support structure 110.

The flap deployment apparatus 100B that includes members 116 that are connected to the support structure 110 on either side of the aft fitting 140. The members 116 may be various components attached to the support structure 110 that may reinforce the structural aspect of the support structure 110. For example, the members 116 may be sheet metal panels. As discussed herein, the structural components of the flap deployment apparatus 100B, the support structure 110 and the carrier beam 150, each include aerodynamic surfaces 115, 155 that eliminates the need to cover the flap deployment apparatus 100B with a fairing. Instead, two small fairings, nose fairing 130 and mid fairing 180, having external aerodynamic surfaces may be used to define a continuous aerodynamic surface 101 on the exterior of the flap deployment apparatus 100B when the carrier beam 150 is in the stowed position. FIG. 2 shows the nose fairing 130 in dash for clarity purposes concerning the components of the flap deployment apparatus 100B over which the nose fairing 130 is positioned.

Figure 3:
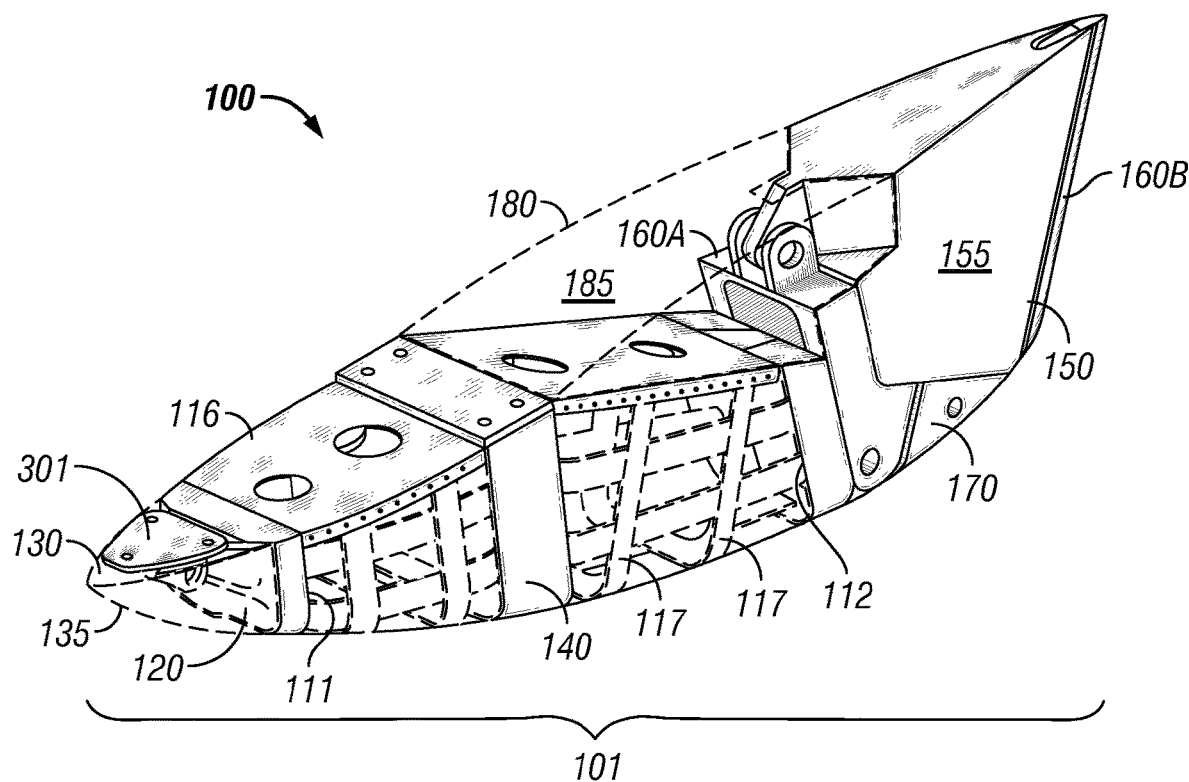
FIG. 3 shows a schematic of one example of a flap deployment apparatus having a continuous aerodynamic surface.

FIG. 3 shows a schematic of one example of a flap deployment apparatus 100 having a continuous aerodynamic surface. The flap deployment apparatus 100 includes a support structure 110 that may be connected to a wing 300 of an aircraft and a carrier beam 150 that may be connected to a flap 310 of an aircraft. The support structure 110 is a structural component that also includes a first aerodynamic surface 115. The support structure 110 may include internal stiffener members 117 and members 116 that increase the structural aspects of the support structure 110. A nose fitting 120 is connected to a first end 111 of the support structure 110. The nose fitting 120 is configured to connect to plate 301 that connects the support structure 110 to the wing 300.

As discussed herein, the structural components of the flap deployment apparatus 100, the support structure 110 and the carrier beam 150, each include aerodynamic surfaces 115, 155 that eliminates the need to cover the flap deployment apparatus 100 with a fairing. Instead, two small fairings, nose fairing 130 and mid fairing 180, having external aerodynamic surfaces may be used to define a continuous aerodynamic surface 101 on the exterior of the flap deployment apparatus 100 when the carrier beam 150 is in the stowed position. FIG. 3 shows the mid fairing 180 in dash for clarity purposes concerning the components of the flap deployment apparatus 100 positioned beneath the mid fairing 180. Likewise, the nose fairing 130 is shown in dash for clarity purposes concerning the components of the flap deployment apparatus 100 over which the nose fairing 130 is positioned.

Figure 6A:
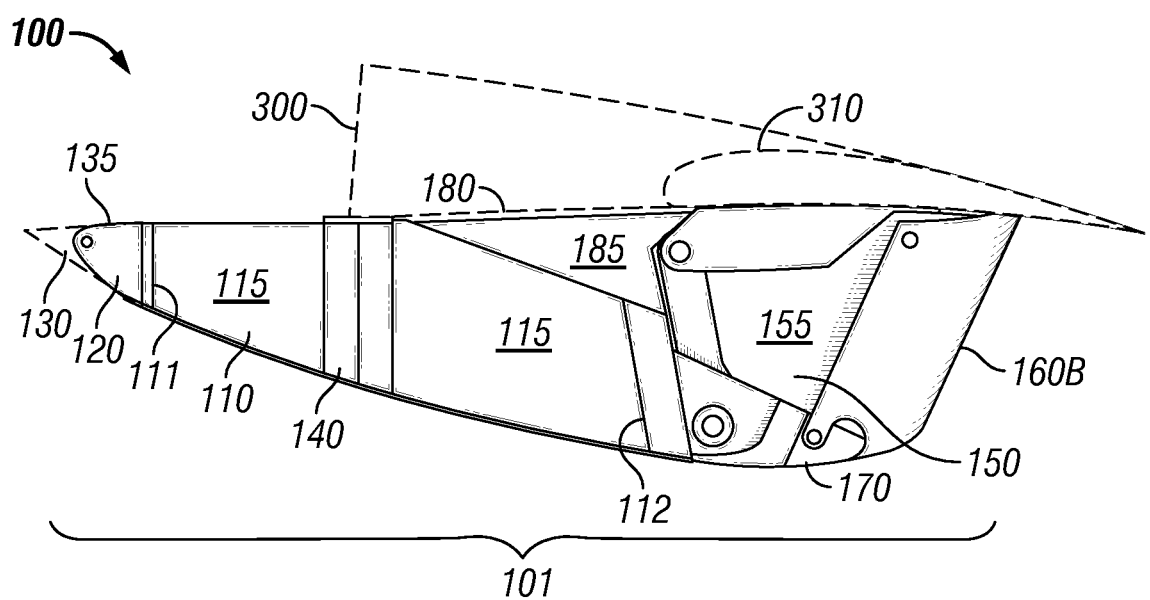
FIGS. 6A-6D show schematics of one example of a flap deployment apparatus having a continuous aerodynamic surface moving from a first position to a second position.
Figure 6B:
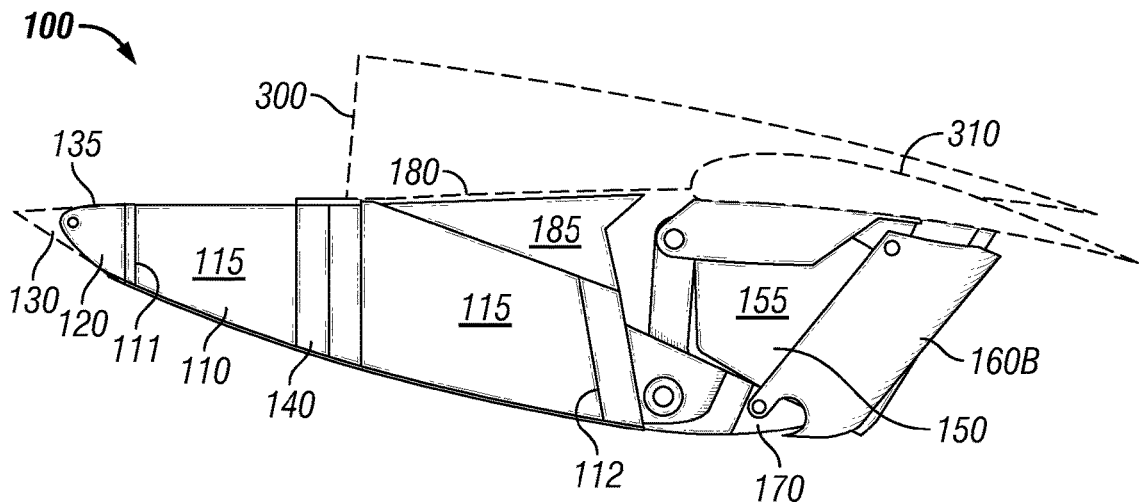
Figure 6C:
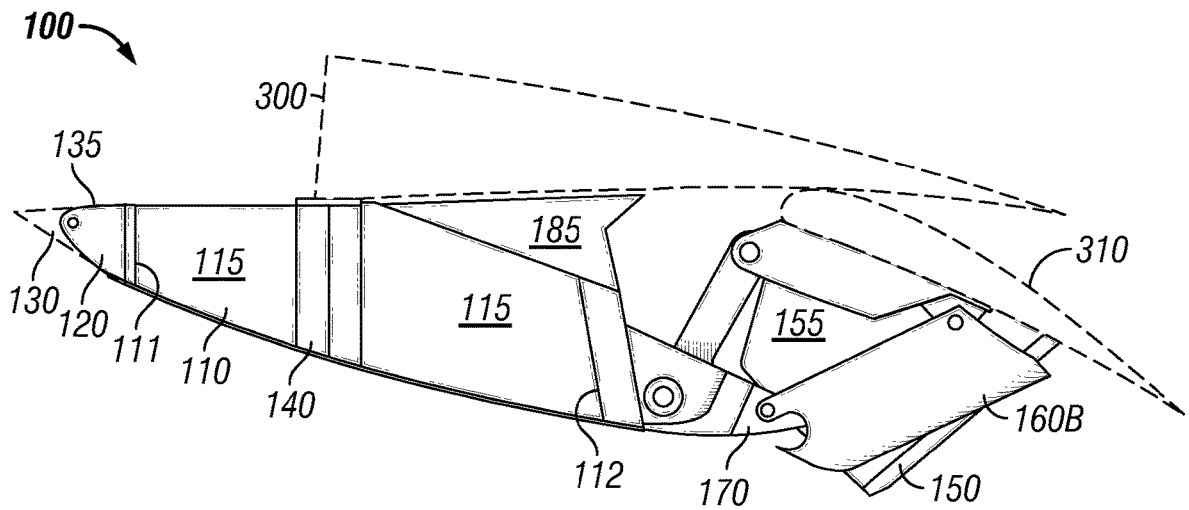
Figure 6D:
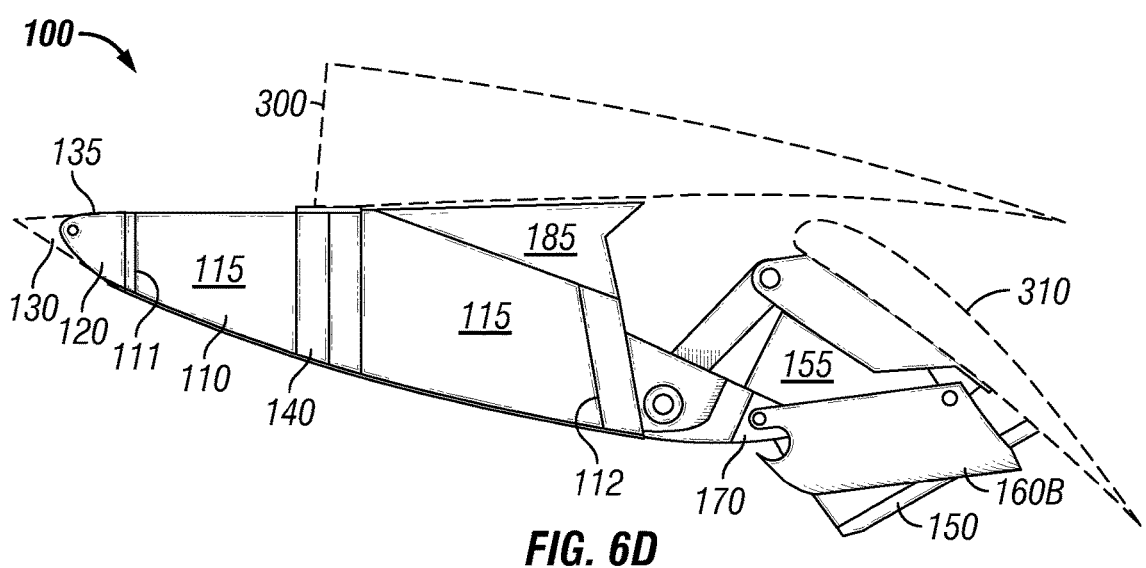
Figure 7:
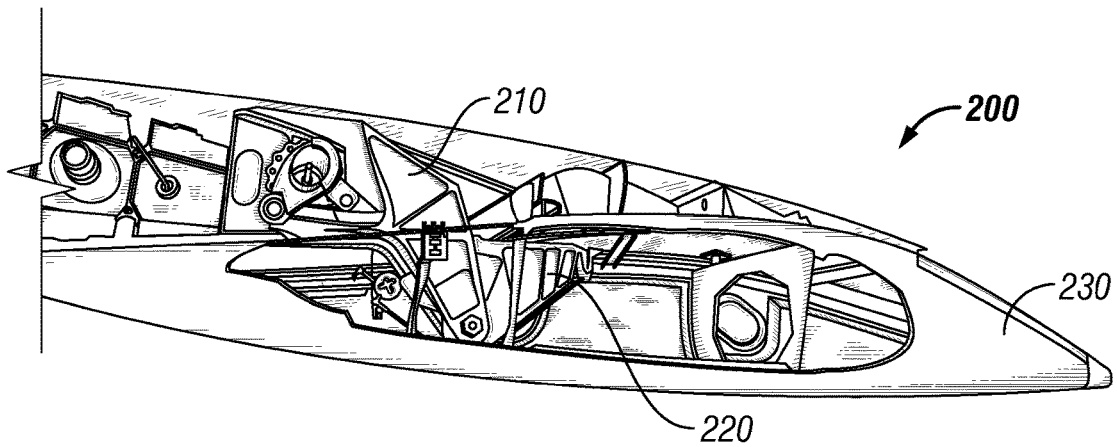
FIG. 7 shows a schematic of a prior flap deployment apparatus and fairing cover.

FIG. 6A shows a schematic of one example of a flap deployment apparatus 100 with the carrier beam 150 is in the stowed position. In the stowed position, the first aerodynamic surface 115 of the support structure 110 in combination with the second aerodynamic surface 155 of the carrier beam 150, the third aerodynamic surface 135 of the nose fairing 130, and the fourth aerodynamic surface 185 of the mid fairing 180 define a continuous aerodynamic surface 101 along the exterior of the flap deployment apparatus 100. FIG. 6B shows a schematic of the flap deployment apparatus deployed at approximately 20 degrees of rotation. FIG. 6C shows a schematic of the flap deployment apparatus deployed at approximately 40 degrees of rotation. FIG. 6D shows the flap deployment apparatus 100 in the deployed, or second, position of approximately 55 degrees rotation. The degree of rotation in FIGS. 6B-6D are shown for illustrative purposes and may be varied depending on application. For example, the flap deployment apparatus 100 may rotated at more than 55 degrees, at 55 degrees, or less than 55 degrees when at the deployed position depending on the application. FIGS. 6A-6D show the nose fairing 130 in dash for clarity purposes concerning the components of the flap deployment apparatus 100 over which the nose fairing 130 is positioned.

Figure 8:
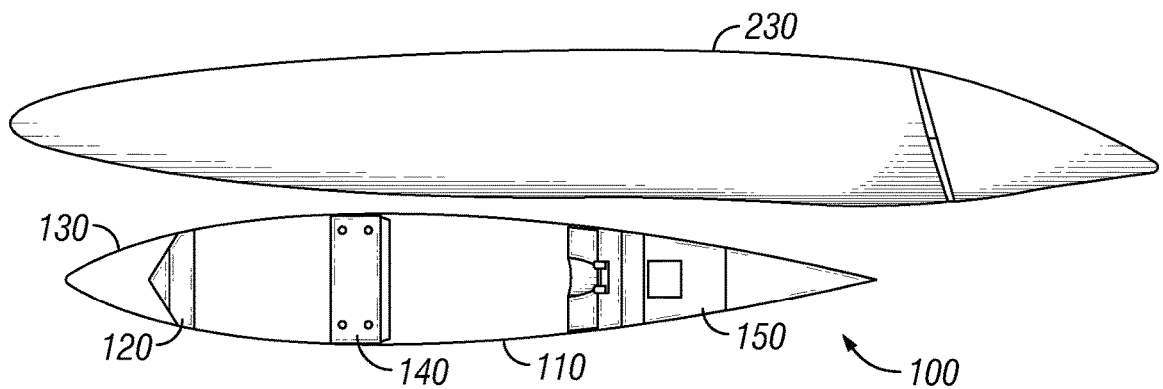
FIG. 8 shows a top view schematic of the aerodynamic profiles of an example of a flap deployment apparatus having a continuous aerodynamic surface in comparison to a prior flap deployment apparatus.
Figure 9:
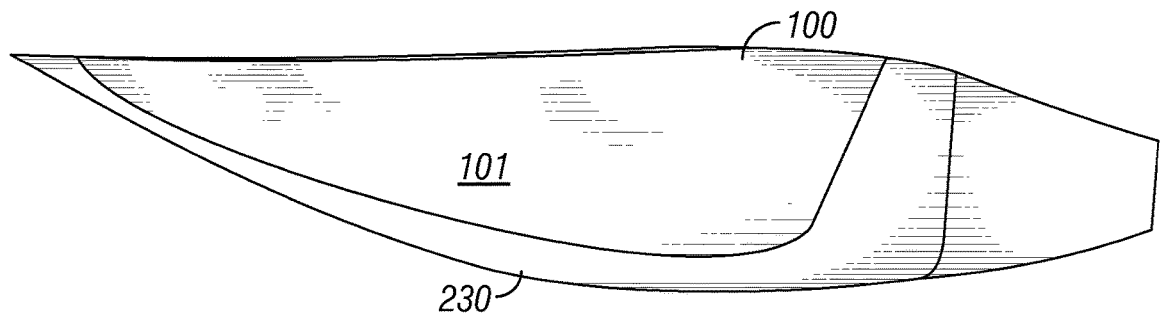
FIG. 9 shows a side view schematic of the aerodynamic profiles of an example of a flap deployment apparatus having a continuous aerodynamic surface in comparison to a prior flap deployment apparatus.

FIG. 8 shows a partial cross-section top view schematic of the aerodynamic profiles of an example of a flap deployment apparatus 100 having a continuous aerodynamic surface in comparison to the fairing 230 of a prior flap deployment apparatus 200. Likewise, FIG. 9 shows a side view schematic of the aerodynamic profiles of an example of a flap deployment apparatus 100 having a continuous aerodynamic surface 101 in comparison to the fairing 230 of a prior flap deployment apparatus 200. The aerodynamic surfaces of the nose fairing 130, support structure 110, and carrier beam 150 combine to form a continuous aerodynamic surface 101 having a smaller profile than the fairing 230 as shown in FIGS. 8 and 9. The smaller profile may reduce the drag of the aircraft in comparison to the fairings 230 used in prior flap deployment systems.

Figure 10:
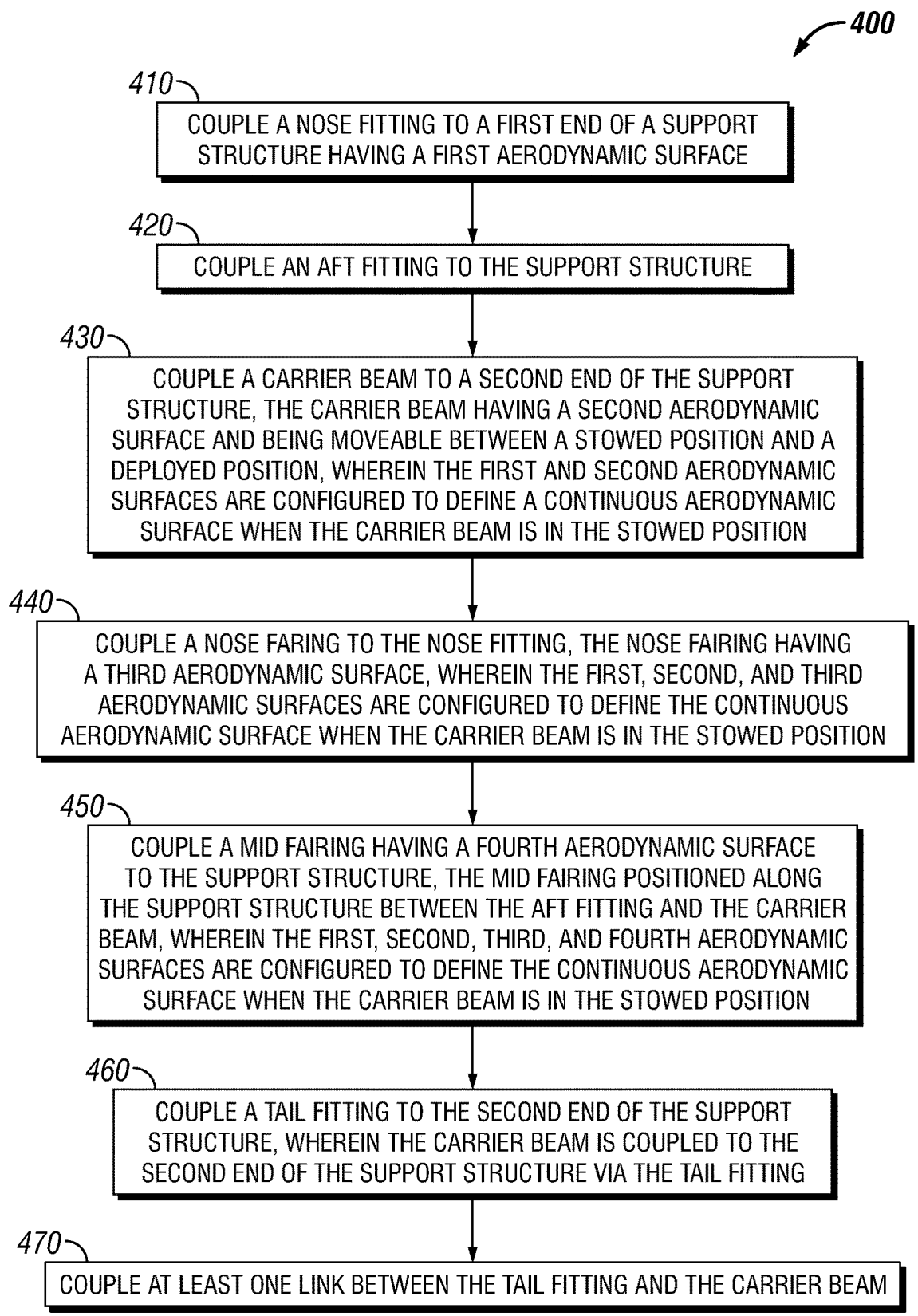
FIG. 10 is a flow chart of one example of a method of providing a flap deployment apparatus.

FIG. 10 is a flow chart of one example of a method 400 of providing a flap deployment apparatus. The method 400 comprises coupling a nose fitting to a first end of a support structure that has a first aerodynamic surface, at 410. For example, a metallic nose fitting 120 may be integrally formed on a first end 111 during the manufacture of a support structure 110 comprised of a composite material. The method 400 includes coupling an aft fitting to the support structure, at 420. For example, a metallic aft fitting 140 may be integrally formed within a support structure 110 during the manufacture of a support structure 110 comprised of a composite material.

The method 400 comprises coupling a carrier beam to a second end of the support structure, the carrier beam having a second aerodynamic surface and being movable between a stowed position and a deployed position, wherein the first and second aerodynamic surfaces are configured to define a continuous aerodynamic surface when the carrier beam is in the stowed position, at 430. For example, a carrier beam 150 having a second aerodynamic surface 155 may be coupled to a second end 112 of a support structure 110. The first aerodynamic surface 115 of the support structure 110 and the second aerodynamic surface 155 of the carrier beam 150 defining a continuous aerodynamic surface 101 on the exterior of the flap deployment apparatus 100 when the carrier beam 150 is in the stowed position.

The method 400 includes coupling a nose fairing to the nose fitting, the nose fairing having a third aerodynamic surface, wherein the first, second, and third aerodynamic surfaces are configured to define the continuous aerodynamic surface when the carrier beam is in the stowed position, at 440. For example, a nose fairing 130 may be coupled and/or positioned over the nose fitting 120. The nose fairing 130 has a third aerodynamic surface 135, which in combination with the first aerodynamic surface 115 of the support structure 110 and the second aerodynamic surface 155 of the carrier beam 150 form a continuous aerodynamic surface 101 on the exterior of the flap deployment apparatus 100.

The method 400 includes coupling a mid fairing having a fourth aerodynamic surface to the support structure, the mid fairing being positioned along the support structure between the aft fitting and the carrier beam, wherein the first, second, third, and fourth aerodynamic surfaces are configured to define the continuous aerodynamic surface when the carrier beam is in the stowed position, at 450. For example, a mid fairing 180 is positioned along the support structure 110 between the aft fitting 140 and the carrier beam 150. The mid fairing 180 has a fourth aerodynamic surface 185, which in combination with the first aerodynamic surface 115 of the support structure 110, the second aerodynamic surface 155 of the carrier beam 150, and the third aerodynamic surface 135 of the nose fairing 130 form a continuous aerodynamic surface 101 on the exterior of the flap deployment apparatus 100.

The method 400 comprises coupling a tail fitting to the second end of the support structure, wherein the carrier beam is coupled to the second end of the support structure via the tail fitting, at 460. For example, a tail fitting 170 is coupled to the second end 112 of the support structure 110. The tail fitting 170 couples the carrier beam 150 to the second end 112 of the support structure 110. Alternatively, the tail fitting 170 may be integral to the support structure 110. The method 400 include coupling at least one link between the tail fitting and the carrier beam, at 470. For example, one or more links 160A, 160B may be coupled between the tail fitting 170 and the carrier beam 150. The one or more links 160A, 160B may guide the carrier beam 150 between the stowed, or first, position and the deployed, or second, position.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A flap deployment system for a wing of an aircraft comprising:
   a support structure having a first aerodynamic surface;
   a nose fitting coupled to a first end of the support structure, the nose fitting configured to secure the support structure to a forward portion of the wing;
   an aft fitting coupled to the support structure, the aft fitting configured to secure the support structure to an aft portion of the wing;
   a carrier beam coupled to a second end of the support structure, the carrier beam being movable between a stowed position and a deployed position and having a second aerodynamic surface, wherein the carrier beam is configured to be coupled to a flap of the wing;
   a plurality of links configured to guide the carrier beam between the stowed position and the deployed position; and
   a tail fitting coupled to the second end of the support structure, wherein the tail fitting directly couples the carrier beam to the second end of the support structure.

2. The flap deployment system of claim 1, comprising a nose fairing disposed over the nose fitting, the nose fairing having a third aerodynamic surface.

3. The flap deployment system of claim 2, comprising a mid fairing having a fourth aerodynamic surface, the mid fairing positioned between the aft fitting and the carrier beam and the mid fairing positioned between the support structure and the wing.

4. The flap deployment system of claim 3, wherein the first, second, third, and fourth aerodynamic surfaces are configured to define a continuous aerodynamic surface when the carrier beam is in the stowed position.

5. The flap deployment system of claim 1, wherein the support structure is comprised of a composite material.

6. The flap deployment system of claim 5, wherein the nose fitting is comprised of a metallic fitting and wherein the aft fitting is comprised of a metallic fitting.

7. The flap deployment system of claim 1, wherein the support structure is a semi-monocoque structure.

8. A flap deployment apparatus comprising:
a support structure having a first end and a second end, the support structure having a first aerodynamic surface;
a nose fitting coupled to the first end of the support structure;
an aft fitting coupled to the support structure, the aft fitting positioned between the first end and the second end;
a tail fitting coupled to the second end of the support structure;
a carrier beam having a second aerodynamic surface and coupled to the second end of the support structure via the tail fitting, the carrier beam being movable between a first position and a second position; and
a nose fairing disposed over the nose fitting, the nose fairing having a third aerodynamic surface;
at least one link configured to guide the carrier beam between the first position and the second position; and
wherein the first, second, and third aerodynamic surfaces are configured to define a continuous aerodynamic surface when the carrier beam is in the first position.

9. The flap deployment apparatus of claim 8, wherein the support structure is a semi-monocoque structure.

10. The flap deployment apparatus of claim 9, wherein the at least one link is coupled between the tail fitting and the carrier beam.

11. The flap deployment apparatus of claim 10, further comprising at least two links coupled between the tail fitting and the carrier beam.

12. The flap deployment apparatus of claim 8, comprising a mid fairing having a fourth aerodynamic surface, the mid fairing positioned between the aft fitting and the carrier beam.

13. The flap deployment apparatus of claim 12, wherein the first, second, third, and fourth aerodynamic surfaces are configured to define a continuous aerodynamic surface when the carrier beam is in the first position.

14. The flap deployment apparatus of claim 8, wherein the support structure is comprised of a composite material.

15. The flap deployment apparatus of claim 14, wherein the nose fitting is comprised of a metallic fitting and wherein the aft fitting is comprised of a metallic fitting.

16. A method of providing a flap deployment apparatus comprising:
coupling a nose fitting to a first end of a support structure, the support structure having a first aerodynamic surface;
coupling an aft fitting to the support structure;
coupling a tail fitting to a second end of the support structure; and
coupling a carrier beam directly to a second end of the support structure via the tail fitting, the carrier beam having a second aerodynamic surface and being movable between a stowed position and a deployed position, wherein the first and second aerodynamic surfaces are configured to define a continuous aerodynamic surface when the carrier beam is in the stowed position.

17. The method of providing a flap deployment apparatus of claim 16, comprising coupling a nose fairing to the nose fitting, the nose fairing having a third aerodynamic surface, wherein the first, second, and third aerodynamic surfaces are configured to define the continuous aerodynamic surface when the carrier beam is in the stowed position.

18. The method of providing a flap deployment apparatus of claim 17, comprising coupling a mid fairing having a fourth aerodynamic surface to the support structure, the mid fairing positioned along the support structure between the aft fitting and the carrier beam, wherein the first, second, third, and fourth aerodynamic surfaces are configured to define the continuous aerodynamic surface when the carrier beam is in the stowed position.

19. The method of providing a flap deployment apparatus of claim 16, wherein the support structure is comprised of a composite material.

20. A flap deployment system for a wing of an aircraft comprising:
a support structure having a first aerodynamic surface;
a nose fitting coupled to a first end of the support structure, the nose fitting configured to secure the support structure to a forward portion of the wing;
an aft fitting coupled to the support structure, the aft fitting configured to secure the support structure to an aft portion of the wing;
a carrier beam coupled to a second end of the support structure, the carrier beam being movable between a stowed position and a deployed position and having a second aerodynamic surface, wherein the carrier beam is configured to be coupled to a flap of the wing;
a plurality of links configured to guide the carrier beam between the stowed position and the deployed position;
a tail fitting coupled to the second end of the support structure, wherein the tail fitting couples the carrier beam to the second end of the support structure;
wherein the plurality of links are coupled between the tail fitting and the carrier beam; and
a nose fairing disposed over the nose fitting, the nose fairing having a third aerodynamic surface.

* * * * *